(12) United States Patent
Minagawa et al.

(10) Patent No.: US 8,080,188 B2
(45) Date of Patent: Dec. 20, 2011

(54) MANUFACTURING APPARATUS AND MANUFACTURING METHOD FOR SOLID PARTICLE

(75) Inventors: Kazumi Minagawa, Ibaraki (JP); Hirohisa Yamada, Ibaraki (JP); Kenji Tamura, Ibaraki (JP)

(73) Assignee: National Institute For Materials Science, Ibaraki (JP)

( * ) Notice: Subject to any disclaimer, the term of this patent is extended or adjusted under 35 U.S.C. 154(b) by 148 days.

(21) Appl. No.: 12/603,932

(22) Filed: Oct. 22, 2009

(65) Prior Publication Data

US 2010/0127416 A1    May 27, 2010

Related U.S. Application Data

(60) Provisional application No. 61/239,222, filed on Sep. 2, 2009.

(30) Foreign Application Priority Data

Oct. 23, 2008    (JP) .................................. 2008-273045

(51) Int. Cl.
*B29B 9/00*    (2006.01)
(52) U.S. Cl. ............................................................ 264/8
(58) Field of Classification Search .................... None
See application file for complete search history.

(56) References Cited

U.S. PATENT DOCUMENTS

| | | | | |
|---|---|---|---|---|
| 4,356,133 | A | * | 10/1982 | Cowen et al. ..................... 264/8 |
| 5,019,302 | A | * | 5/1991 | Sparks et al. ..................... 264/8 |
| 7,074,353 | B2 | * | 7/2006 | Jachuck et al. ................... 264/7 |

FOREIGN PATENT DOCUMENTS

JP    2008-127248    6/2008

OTHER PUBLICATIONS

Kazumi Minagawa et al., "Abstract of the 52$^{nd}$ meeting for discussing on Clay Science", published by The Clay Science Society of Japan, pp. 230-231, Sep. 3, 2008 w/English translation.

* cited by examiner

*Primary Examiner* — Mary F Theisen
(74) *Attorney, Agent, or Firm* — Wenderoth, Lind & Ponack, L.L.P.

(57) ABSTRACT

The apparatus for manufacturing solid particles at a nano level includes a chamber for isolation from an external space, a monoaxial rotary disk disposed in the chamber, a receiving surface at one end of the rotary disk, a material supply mechanism for supplying the material to the receiving surface, a rotary mechanism for applying a centrifugal force to the rotary disk so that the raw material supplied to the receiving surface is produced into a thin film and atomized and scattered from the outer peripheral edge, and a control mechanism for the temperature in the chamber that controls the temperature at least at the outer peripheral edge of the receiving surface and on the side nearer to the center of rotation to a temperature lower than a volatilization temperature of a volatile solvent and the temperature at the outer side therefrom to the volatilization temperature of the volatile solvent or higher.

4 Claims, 5 Drawing Sheets

[Fig. 1]
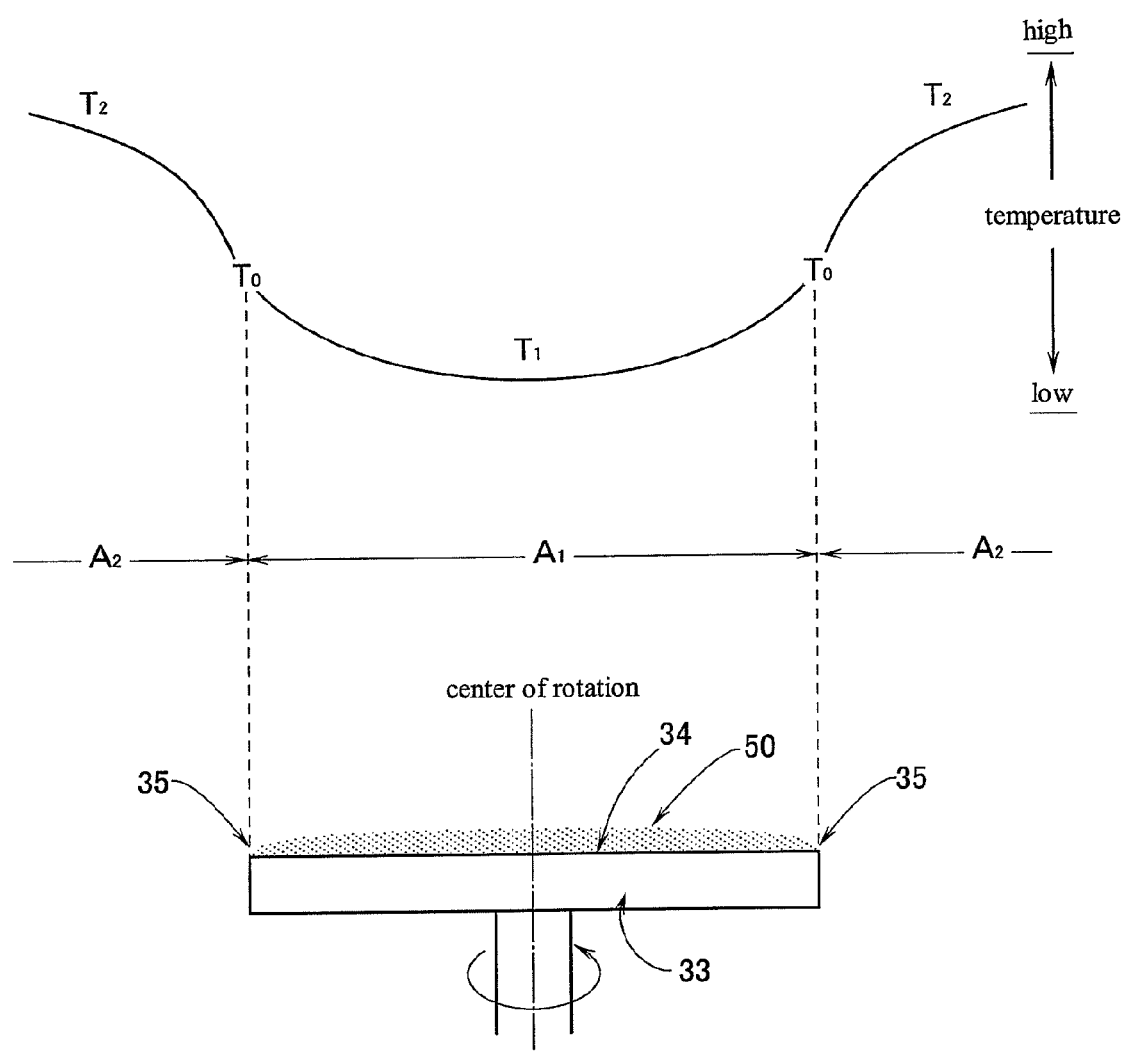

[Fig. 2]
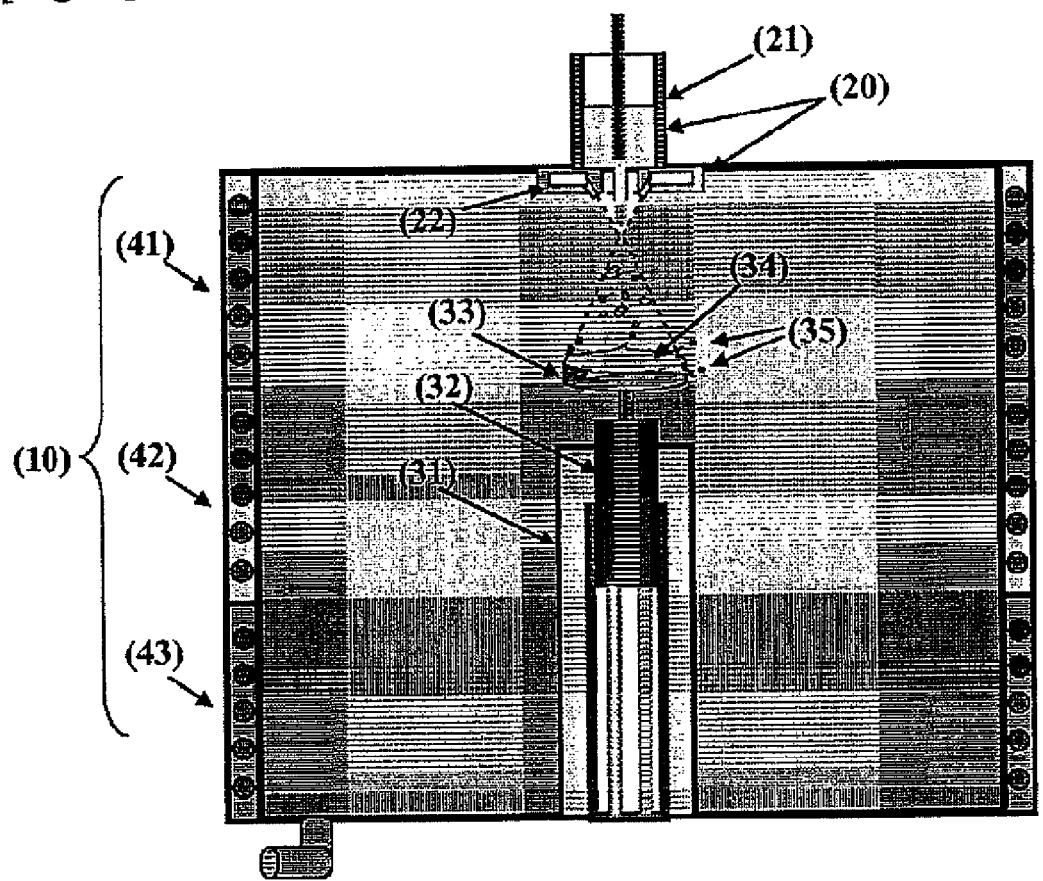

[Fig. 3]
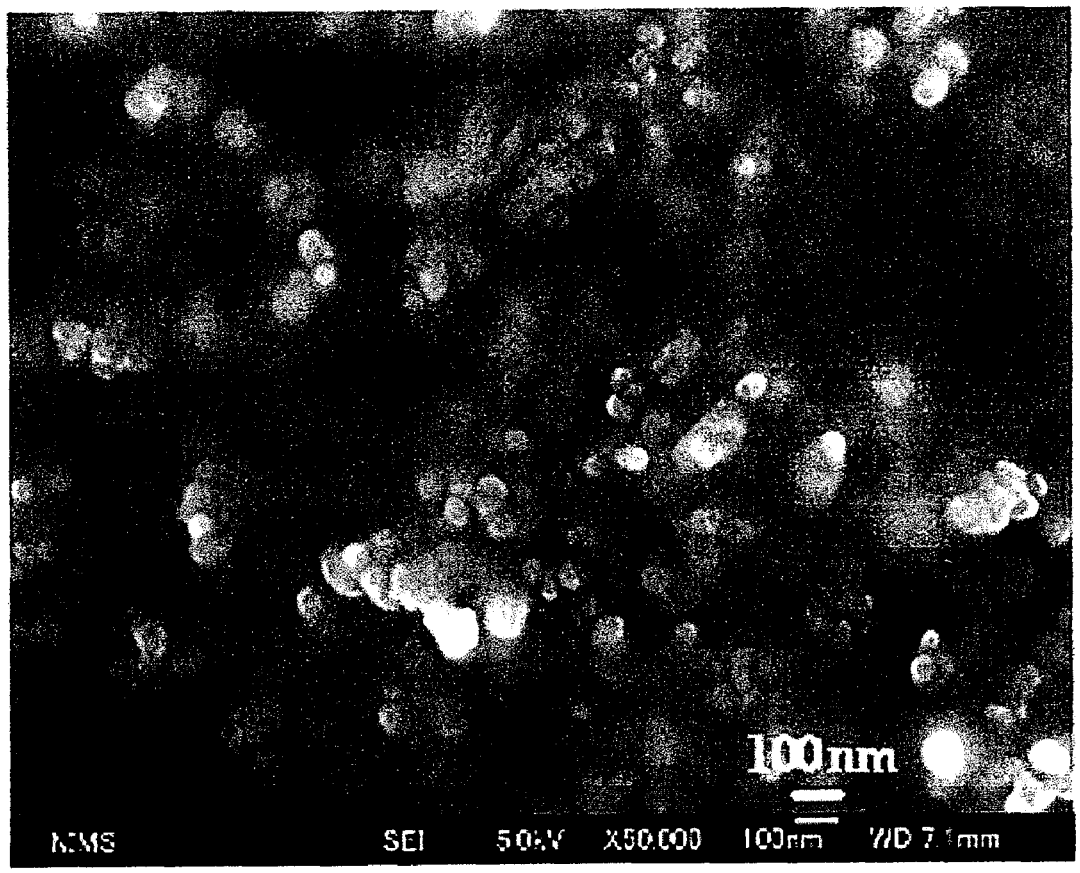
Saponite nano particles formed by the apparatus in the example according to the invention
(SEM image)

[Fig. 4]
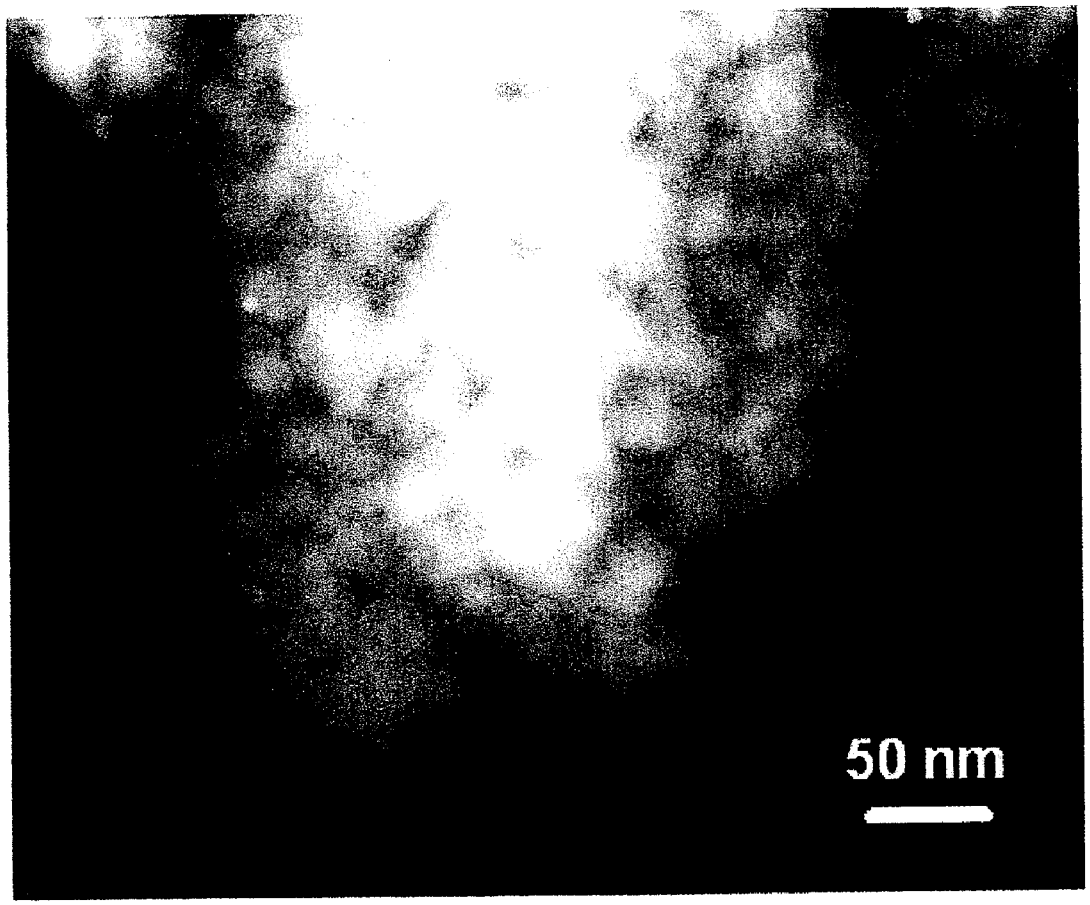
Saponite nano particles formed by the apparatus in the example according to the invention
(TEM image)

[Fig. 5]
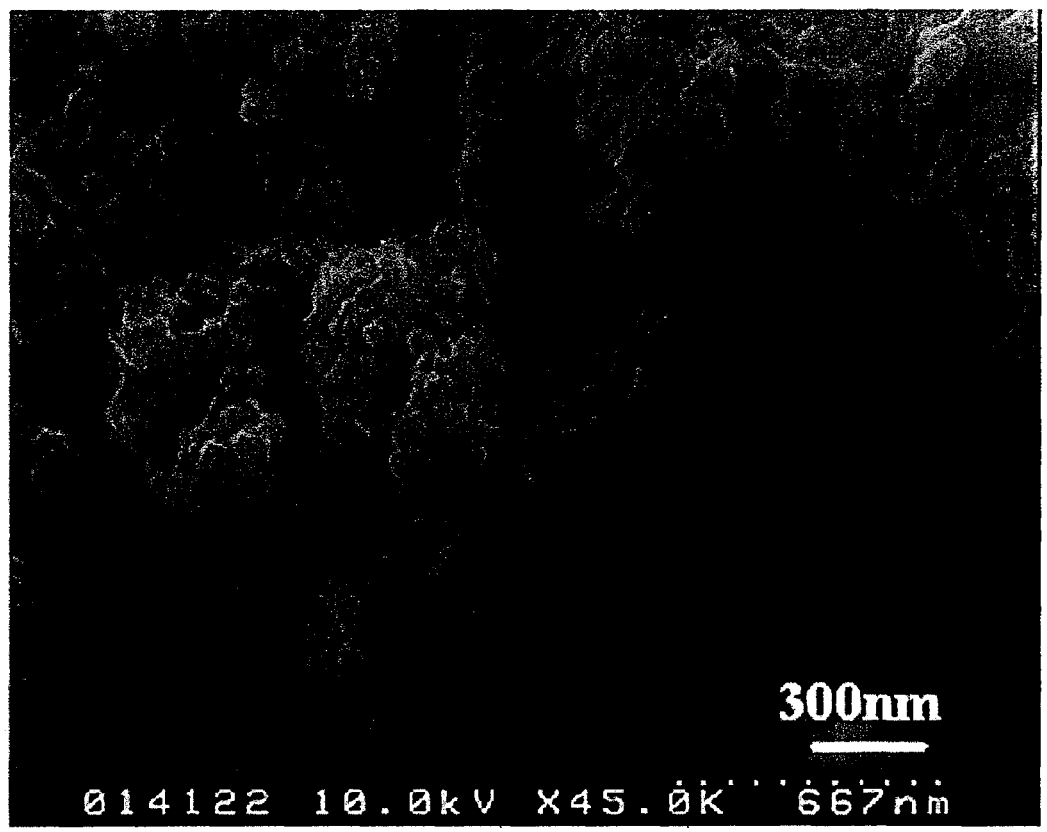
Alumino silicate nano particles formed by the apparatus in the example according to the invention
(TEM image)

MANUFACTURING APPARATUS AND MANUFACTURING METHOD FOR SOLID PARTICLE

This application claims the benefit of U.S. Provisional Application No. 61/239,222, filed Sep. 2, 2009.

TECHNICAL FIELD

The present invention involves an apparatus and a method for manufacturing solid particles from a material in which a solid ingredient is dissolved in a volatile solvent by drying and then removing the solvent.

BACKGROUND

In a background art as an apparatus and a method for manufacturing solid particles from a molten metal or alloy, or a liquid substance dissolved or dispersed with a solid ingredient in a solvent, a spinning method has been well known and already put to use. However, there is a limit in a size of a solid particle obtained by the spinning method of the background art, and a lower limit of the particle size is about several micrometers.

Furthermore, the present inventors have already proposed a method of atomization and crystallization using oxides or hydroxides as the solid ingredient as shown by JP-A No. 2008-127248 (Patent Reference 1), although in the method by atomization and scattering from a receiving surface above a rotary disk, the particle diameter is also in the order of a micrometer at most.

However, the spinning method is highly useful in view of simplicity and easiness and high productivity thereof, uniformity of the particle, and therefore, also from a view point of fulfilling a function of solid particles, it has been anticipated to realize a method of enabling the manufacture of solid particles with a particle diameter at the nano level, that is, a nanometer scale less than one micrometer.

SUMMARY OF INVENTION

In view of the situations described above, the present invention intends to provide a method of efficiently manufacturing solid particles with a particle diameter at the nano level.

The invention is characterized in the following to resolve the problem described above.

An apparatus for manufacturing solid particles by drying and then removing a solvent from a material dissolved with a solid ingredient in a volatile solvent, the first aspect of the invention, includes a chamber for isolation from an external space, a monoaxial rotary disk inside the chamber, a receiving surface at one end of the rotary disk, a material supply mechanism for supplying the material to the receiving surface, a rotary mechanism for applying a centrifugal force to the rotary disk so that the material supplied to the receiving surface can be produced into a thin film, atomized and scattered from the outer peripheral edge, and a control mechanism for the temperature in the chamber that controls an atmospheric temperature of the material before being atomized and scattered to a temperature lower than a volatilization temperature of the volatile solvent and the atmospheric temperature of the material which is atomized and scattered to the volatilization temperature of the volatile solvent or higher.

For the second aspect of the invention, in the first aspect of the apparatus, the receiving surface is constituted by a horizontal face, and the control mechanism for the temperature in the chamber is constituted by a first heater for controlling to heat a space in the chamber upward from the receiving surface, and a second heater for controlling to heat a space in the chamber downward from the space.

The method of manufacturing solid particles by drying and then removing a solvent from a material dissolved with a solid ingredient in a volatile solvent is the third aspect of the invention and includes dropping a material to a receiving surface perpendicular to the center of the rotation of a monoaxial rotary disk, producing a thin film of the material on the receiving surface by a centrifugal force, atomizing and scattering the same from the outer peripheral edge of the receiving surface, heating and evaporating the solvent to provide the solid particles after atomizing and scattering the same.

In the fourth aspect of the invention, the solid ingredient of the material in the method for manufacturing the solid particles according to the third aspect is an oxide or an hydroxide.

The manufacturing apparatus and the manufacturing method of the invention are essentially characterized in controlling an atmospheric temperature ($T_1$) before atomizing and scattering by the receiving surface of the rotary disk, an atmospheric temperature ($T_2$) after atomizing and scattering, and the evaporation temperature ($T_0$) of the solvent as a relationship thereamong to $$T_1 < T_0 \leqq T_2$$

First, until a material is atomized and scattered from an outer peripheral edge of the thin film at the receiving surface of the rotary disk, by restraining evaporation of the solvent, a thickness of the thin film immediately before atomizing and scattering can be thinned, and the size of the atomized and scattered particle can be decreased.

Further, by elevating the atmospheric temperature ($T_2$) in a state of floating the particles in the chamber after having been atomized and scattered as described above, the solvent is evaporated and removed, the atomized and scattered particle is not large-sized by being stored to some place, the diameter becomes small by an amount of removing the solvent component from the scattered particle.

Therefore, as shown also in examples, the solid particle having the diameter at the nano level can be produced, and can be provided in a state of being uniform in the particle diameter by making use of a characteristic of the centrifugal atomization.

BRIEF DESCRIPTION OF DRAWINGS

FIG. 1 is an outline view of a control of an atmospheric temperature of the invention;

FIG. 2 is a vertical cross sectional view showing the outline of the apparatus in Example 1;

FIG. 3 shows saponite nano particles (SEM image);

FIG. 4 shows saponite nano particles (TEM image); and

FIG. 5 shows alumino silicate nano particles produced by the apparatus of the invention (TEM image).

DETAILED DESCRIPTION OF THE INVENTION

The invention has a characteristic of controlling the atmospheric temperature before and after atomizing and scattering a material, which cannot be conceived from background arts.

Furthermore, by using a material dissolved with a solid ingredient in a volatile solvent, even when the particle diameter immediately after atomizing and scattering is at, for example, a micrometer level, by evaporating and removing the solvent thereafter, the diameter is decreased, and the particle having the particle diameter at the nano scale is able to be manufactured.

Here, there is a great variety of the combination of the solid ingredient and the volatile solvent. For example, as the volatile solvent, water, alcohol, ether etc., or mixtures of these are acceptable. As the solid ingredient, its important factor is that solid ingredient is dissolved in the solvent, and is dried to solidify by evaporating. However, the invention is not limited only thereby.

For example, any of various kinds of inorganic oxides, inorganic hydroxides, described in Patent Reference 1 can be used in the invention. As the volatile solvents, and the inorganic oxides, inorganic hydroxides, for example, hectorite, montmorillonite etc. are pointed out.

In producing solid ingredients, not only physical precipitation or crystallization, but a chemical reaction may be accompanied. For example, hydrate particles may be formed in inorganic particles, organic salts etc., otherwise, in a case of using a solution dissolved with an organic monomer in a volatile solvent, formation of small particles of the monomer can be achieved in the form of uniform particle diameter.

As has already been described in the Summary of Invention, the invention is based on the control of the atmospheric temperature in correspondence with a change in a state of a material, and an ideal control pattern thereof is shown in FIG. 1.

The pattern is on the premise that a material is supplied to a receiving surface (34) from above the receiving surface (34) in the drawing, and on the premise that the atomized and scattered material does not reach the upper side of the receiving face (34).

That is, when an upper face of a rotary disk (33) is made to constitute the receiving surface (34), and a reference is constituted by an outer peripheral edge (35) of a thin film (50) of the material (solution) thereabove, an atmospheric temperature ($T_1$) at the outer peripheral edge and a region ($A_1$) on a side of a center of rotation of the rotary disk (33) therefrom, and an atmospheric temperature ($T_2$) at a region ($A_2$) on an outer side of the outer peripheral edge establish a relationship with an evaporation temperature ($T_0$) of the volatile solvent in the material solution as follows.

$$T_1 < T_0 \leq T_2$$

In this case, "ambient atmosphere" naturally designates a vicinity of the thin film.

Furthermore, in all of the regions $A_1$, $A_2$, the temperatures $T_1$, $T_2$ are not necessarily constant but may have slopes in accordance with distances from the center of rotation as exemplified in FIG. 1.

As means for controlling the temperatures as in $T_1 < T_0 \leq T_2$, heaters (41), (42) and (43) may be provided at plural locations in a chamber arranged with the rotary disk at an inside thereof, and set temperatures thereof may be combined and adjusted (for example, as in Example 1), variously by adjusting irradiation of light or heat or the like.

Naturally, in the apparatus, the method of the invention, as the premise of the essential characteristic of the invention described above, or the combination, the thin film (50) of the material solution is formed on the receiving surface (34) of the rotary disk (33). Therefore, in a material supply mechanism of the manufacturing apparatus, supply (amount, speed) of the material is made to be able to be adjusted, and in a mechanism of rotating the rotary disk, the rotational speed is made to be able to be adjusted. A thickness of the thin film (50) can be decreased by the temperature control of $T_1 < T_0$ described above in accordance with the adjustments. The solid particle at the nano level can be formed thereby.

Further, with regard to the rotating mechanism, a centrifugal force is made to be adjusted by the rotational speed so that scattering time of sufficiently and substantially completely evaporating and removing the volatile solvent from the atomized and scattered material is maintained.

The temperatures $T_1$ and $T_2$ and the rotational speed of the rotary disk described above can be determined in consideration of kinds of the solvent, the solid ingredient and the concentration and viscosity of the solution of the material, an area of the receiving surface, the thickness of the thin film, a desired particle diameter of the solid particle etc.

For example, with regard to the atmospheric temperatures, generally, as differences from the evaporation temperature ($T_0$), it is considered that $T_0-T_1$ falls in a range of 30° C. through 50° C. and $T_2-T_0$ falls in a range of 20° C. through 50° C. Further, it is considered that a rotational number of the rotary disk generally falls in a range of 20000 rpm through 60000 rpm.

Examples are shown as follows, and a further detailed description will be given. Naturally, the invention is not limited by the following examples.

Example 1

An example of the manufacturing apparatus of the invention will be shown in Example 1.

As shown in FIG. 2, the manufacturing apparatus embodied as a cylindrical chamber (10) for isolation from an external space. A tank (21) for storing the material is located at an upper end of the chamber (10). In addition, a nozzle (22) for dropping the material stored in the tank (21) is arranged at a centeral portion of the ceiling of the chamber (10). A material supply mechanism (20) includes the tank (21) and the nozzle (22), which are controlled by adjusting means for material supply.

An electric motor (32) is set up with a rotary shaft (31) in the upward direction at a central portion inside of the chamber (10), and the monoaxial rotary disk (33) is fixed to the upper end of the rotary shaft (31) to constitute a rotational mechanism (30).

The upper face of the rotary disk (33) is arranged as the receiving surface (34) to receive the material which is dropped from the nozzle (22). Then the dropped material is produced into a thin film by rotating the rotary disk (33), and atomized and scattered from the outer peripheral edge (35) into the chamber.

Cylindrical heaters (41), (42) and (43) are partitioned vertically into three stages to the inner surface of the chamber (10), and a temperature control mechanism (40) is set up so that the upper heater (41) heats the space above the receiving surface (34), and the intermediate heater (42) and the lower heater (43) heat the space below the rotary disk (33), the receiving surface (34) while vertically bisecting the space. The temperature is adapted to be the highest at the inner wall of the chamber (10) and heating from the heater is decreased as it approaches the rotary shaft (31).

For example, by plurally partitioning the heater heating system as described above, the atmospheric temperature adjustment of the invention can easily be carried out.

Example 2

Solid particles are manufactured by using the apparatus of Example 1.

The material is shown in Table 1.

TABLE 1

| Experiment No. | Solid ingredient | Solvent | | Dispersion state | |
|---|---|---|---|---|---|
| | | Material | Volatilization temperature | Content of solid ingredient | Viscosity |
| 1 | Saponite | Water | 100° C. | 1 mass % | Low |
| 2 | Alumino silicate | Water | 100° C. | 4 mass % | Low |

The material was stored in the tank and the operation was carried out under operating conditions shown in Table 2. Furthermore, the conditions were previously selected and set by a preliminary experiment.

TABLE 2

| Experiment No. | Material Amount of dropping | Rotary disk Number of rotation rpm | Set temperature | | | |
|---|---|---|---|---|---|---|
| | | | Near the outer peripheral edge ° C. | Upper heater ° C. | Intermediate heater ° C. | Lower heater ° C. |
| 1 | 200 ml | 30000 | 250 | 120 | 150 | 150 |
| 2 | 200 ml | 30000 | 150 | 100 | 100 | 100 |

In Table 2, "near outer peripheral edge" signifies a position near to the outer side of the thin film outer peripheral edge, and temperatures 250° C. (NO. 1), 150° C. (NO. 2) at the position were measured by a thermocouple.

It is confirmed by a preliminary experiment without forming the thin film that in either of Experiments NO. 1 and NO. 2, the atmospheric temperature on the inner side from the outer peripheral edge of the thin film to the center of rotation is less than 100° C.

Further, it was confirmed that the thickness of the thin film at the outer peripheral edge of the thin film is about 100 nanometers in either of NO. 1, NO. 2.

Solid particles provided at the above-described result are as shown in Table 3.

Further, FIG. 3, FIG. 4 show SEM and TEM images of saponite nano particles formed in NO. 1, and FIG. 5 shows TEM image of alumino silicate nano particles formed in NO. 2.

TABLE 3

| Experiment No. | Average particle diameter | Average aspect ratio | Maximum particle diameter | Minimum particle diameter | Reference figure |
|---|---|---|---|---|---|
| 1 | 25 nm | 1 | 32.5 nm | 24.3 nm | FIG. 3, 4 |
| 2 | 40 nm | 1 | 50 nm | 30 nm | FIG. 5 |

Saponite and alumino silicate nano particles are expected not only for the catalytic function but also as nano materials with various functions, for example, as catalyst supporting materials and adsorption materials.

What is claimed is:

1. An apparatus for manufacturing solid particles from a material by atomizing and scattering the material, which includes a solid ingredient dissolved in a volatile solvent, and then drying the solid ingredient by removing the solvent, the apparatus comprising:
    a chamber for isolation from an external space;
    a monoaxial rotary disk disposed in the chamber with a receiving surface at one end of the rotary disk;
    a material supply mechanism for supplying the material to the receiving surface;
    a rotary mechanism for applying a centrifugal force to the rotary disk so that the raw material supplied to the receiving surface can be produced into a thin film and atomized and scattered from an outer peripheral edge; and
    a control mechanism for a temperature in the chamber that controls an atmospheric temperature of the material before being atomized and scattered to a temperature lower than a volatilization temperature of the volatile solvent and the atmospheric temperature of the material which is atomized and scattered to the volatilization temperature of the volatile solvent or higher.

2. The apparatus for manufacturing solid particles according to claim 1, wherein the receiving surface is made to be a horizontal face, and the control mechanism for the temperature in the chamber comprises a first heater for controlling heating of a first space in the chamber upward from the receiving surface, and a second heater for controlling heating of a second space in the chamber downward from the first space.

3. A method of manufacturing solid particles from a material in which a solid ingredient is dissolved in a volatile solvent, the method comprising:
    dropping the material to a receiving surface perpendicular to a center of rotation of a monoaxial rotary disk within a chamber;
    producing a thin film of the raw material on the receiving surface by a centrifugal force;
    atomizing and scattering the material from an outer peripheral edge of the receiving surface;
    heating and evaporating the solvent to provide the solid particles after said atomizing and scattering of the material; and
    controlling a temperature within the chamber so as to control an atmospheric temperature of the material before being atomized and scattered to a temperature lower than a volatilization temperature of the volatile solvent, and so as to control an atmospheric temperature of the atomized and scattered material to the volatilization temperature of the volatile solvent or higher.

4. The method of manufacturing solid particles according to claim 3, wherein the solid ingredient of the material is an inorganic oxide or an inorganic hydroxide.

* * * * *